United States Patent
Chen

(10) Patent No.: US 9,158,315 B2
(45) Date of Patent: Oct. 13, 2015

(54) LOAD TRANSIENT OF A COT MODE POWER SUPPLY

(71) Applicant: Richtek Technology Corporation, Chupei, Hsinchu (TW)

(72) Inventor: Wen-Wei Chen, New Taipei (TW)

(73) Assignee: RICHTEK TECHNOLOGY CORP., Chupei, Hsinchu (TW)

( * ) Notice: Subject to any disclaimer, the term of this patent is extended or adjusted under 35 U.S.C. 154(b) by 185 days.

(21) Appl. No.: 13/900,181

(22) Filed: May 22, 2013

(65) Prior Publication Data

US 2013/0314060 A1    Nov. 28, 2013

(30) Foreign Application Priority Data

May 24, 2012 (TW) .............................. 101118551 A

(51) Int. Cl.
*G05F 1/00* (2006.01)
*G05F 1/46* (2006.01)

(52) U.S. Cl.
CPC ........................................ *G05F 1/46* (2013.01)

(58) Field of Classification Search
USPC .................................. 323/222, 271, 282–285
See application file for complete search history.

(56) References Cited

U.S. PATENT DOCUMENTS

| 7,579,820 | B2 * | 8/2009 | Hane ............................... 323/288 |
| 8,138,739 | B1 | 3/2012 | Eirea et al. |
| 8,395,367 | B2 | 3/2013 | Chien et al. |
| 2006/0043953 | A1 * | 3/2006 | Xu ................................. 323/282 |
| 2008/0061750 | A1 | 3/2008 | Stoichita |
| 2008/0063731 | A1 | 3/2008 | Chang et al. |
| 2009/0153114 | A1 | 6/2009 | Huang |

FOREIGN PATENT DOCUMENTS

| CN | 101150281 A | 3/2008 |
| CN | 101656419 A | 2/2010 |
| CN | 103368393 A | 10/2013 |

* cited by examiner

*Primary Examiner* — Nguyen Tran

(74) *Attorney, Agent, or Firm* — Muncy, Geissler, Olds & Lowe, P.C.

(57) ABSTRACT

A constant on time mode power supplier uses longer constant on time when the output voltage of the constant on time mode power supplier is drooped due to load variation, to increase energy provided to the output of the constant on time mode power supplier for preventing the output voltage from undershooting and shortening the time for the output voltage to recover stable.

10 Claims, 19 Drawing Sheets

LOAD TRANSIENT OF A COT MODE POWER SUPPLY

FIELD OF THE INVENTION

The present invention is related generally to a constant on time (COT) mode power supply and, more particularly, to circuits and methods for improving load transient of a COT mode power supply.

BACKGROUND OF THE INVENTION

There are various types of circuits for implementing constant on time (COT) for power supplies. For example, FIG. 1 shows a popular implementation of a COT mode power supply, in which a feedback circuit 18 detects the output voltage Vo of the COT mode power supply to generate a feedback signal Vfb, a compensator 12 generates an error signal Vcomp responsive to the difference between the feedback signal Vfb and a reference value Vref1, where the compensator 12 shown in FIG. 1 uses a transconductance amplifier (GM), while an operational amplifier may be used instead in other applications, a resistor Rc and a capacitor Cc connected in series at the output of the compensator 12 are compensator components for stabilizing the error signal Vcomp, a ramp generator 10 provides a ramp signal Vramp which is designed based on the input voltage Vin or the output voltage Vo of the COT mode power supply, or is established based on the on and off of the switch M1 to have a waveform similar to that of the inductor current IL, a comparator 14 compares the error signal Vcomp with the ramp signal Vramp to assert a comparison signal Scmp1, and an on time generator 16 triggers a constant on time Ton1 responsive to the comparison signal Scmp1 for a gate driver 20 to control switches M1 and M2 for regulating the output voltage Vo. There are a variety of designs for the on time generator 16, and one of the most popular approaches is to use the input voltage Vin and the output voltage Vo of the COT mode power supply to determine the pulse width of the on time to achieve a constant frequency (CF) or constant current ripple (CCR) COT scheme.

In the COT mode power supply shown in FIG. 1, when the error signal Vcomp becomes equal to the ramp signal Vramp, the comparison signal Scmp1 is asserted to trigger the constant on time Ton1. Use of the ramp signal Vramp not only increases noise immunity of the COT mode power supply but also avoids uttering of the error signal Vcomp. However, the compensator 12 will directly affect the transient response of the COT mode power supply due to its design. For example, if the compensator 12 is designed to have a lower direct-current (DC) gain, then the COT mode power supply has a slower transient response and thus, when the load Ro is changed from light to heavy, the output voltage Vo often occurs undershooting and thus fails to conform with electronic specifications. In order to prevent the output voltage Vo from undershooting, a traditional solution is to increase the capacitance of the capacitor Co at the output terminal of the COT mode power supply; however, such solution increases the costs.

Therefore, it is desired a low cost COT mode power supply capable of preventing its output voltage from undershooting regardless of the design of the compensator used in the COT mode power supply.

SUMMARY OF THE INVENTION

An objective of the present invention is to provide a COT mode power supply with improved load transient.

Another objective of the present invention is to provide a method for improving load transient of a COT mode power supply.

Yet another objective of the present invention is to provide a low cost COT mode power supply capable of preventing its output voltage from undershooting.

Still another objective of the present invention is to provide a low cost method for preventing the output voltage of a COT mode power supply from undershooting.

A further objective of the present invention is to provide a COT mode power supply having a shorter time for its output voltage to become stable.

Still a further objective of the present invention is to provide a method for shortening the time for the output voltage of a COT mode power supply to become stable.

According to the present invention, a COT mode power supply includes a feedback circuit to detect an output voltage of the COT mode power supply to generate a feedback signal, a compensator to generate an error signal responsive to a difference between the feedback signal and a reference value, a ramp generator to provide a ramp signal, a comparator to compare the error signal with the ramp signal to generate a comparison signal, and an on time generator to trigger a first constant on time responsive to the comparison signal for regulating the output voltage. The COT mode power supply detects a load condition based on either or both of the ramp signal and the error signal and the comparison signal, and when the output voltage is drooped due to a load variation, the COT mode power supply generates a second constant on time or increases the pulse width of the first constant on time to increase the energy provided to the output terminal of the COT mode power supply such that the output voltage is prevented from undershooting and takes less time to become stable. In comparison to the traditional COT mode power supplies that increase the output capacitance, the COT mode power supply according to the present invention is of lower costs.

According to the present invention, a method for improving load transient of a COT mode power supply includes detecting an output voltage of the COT mode power supply to generate a feedback signal, generating an error signal responsive to a difference between the feedback signal and a reference value, comparing the error signal with the ramp signal to generate a comparison signal, triggering a first constant on time responsive to the comparison signal for regulating the output voltage, and detecting a load condition based on either or both of the ramp signal and the error signal and the comparison signal. When the output voltage is drooped due to a load variation, a second constant on time is generated or the pulse width of the first constant on time is increased to increase the energy provided to the output terminal of the COT mode power supply such that the output voltage is prevented from undershooting and takes less time to become stable.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
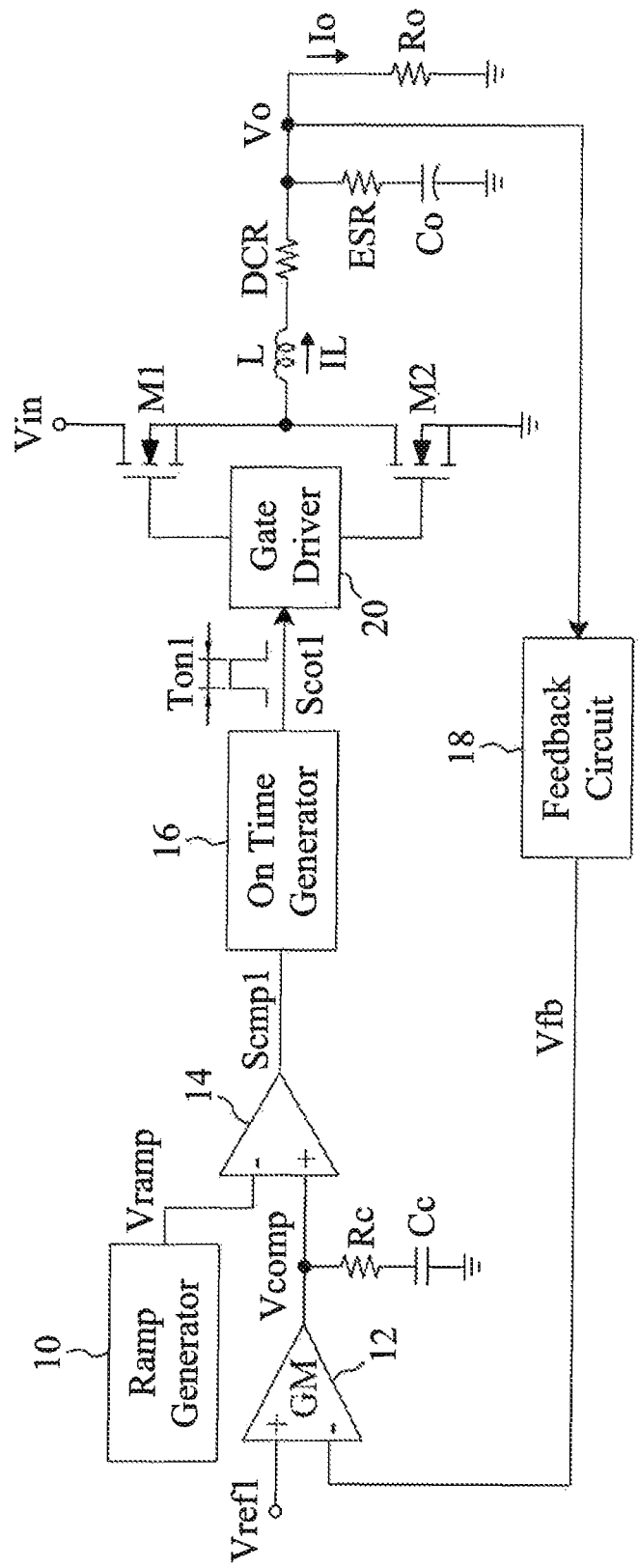
FIG. 1 shows a traditional COT mode power supply.
Figure 2:
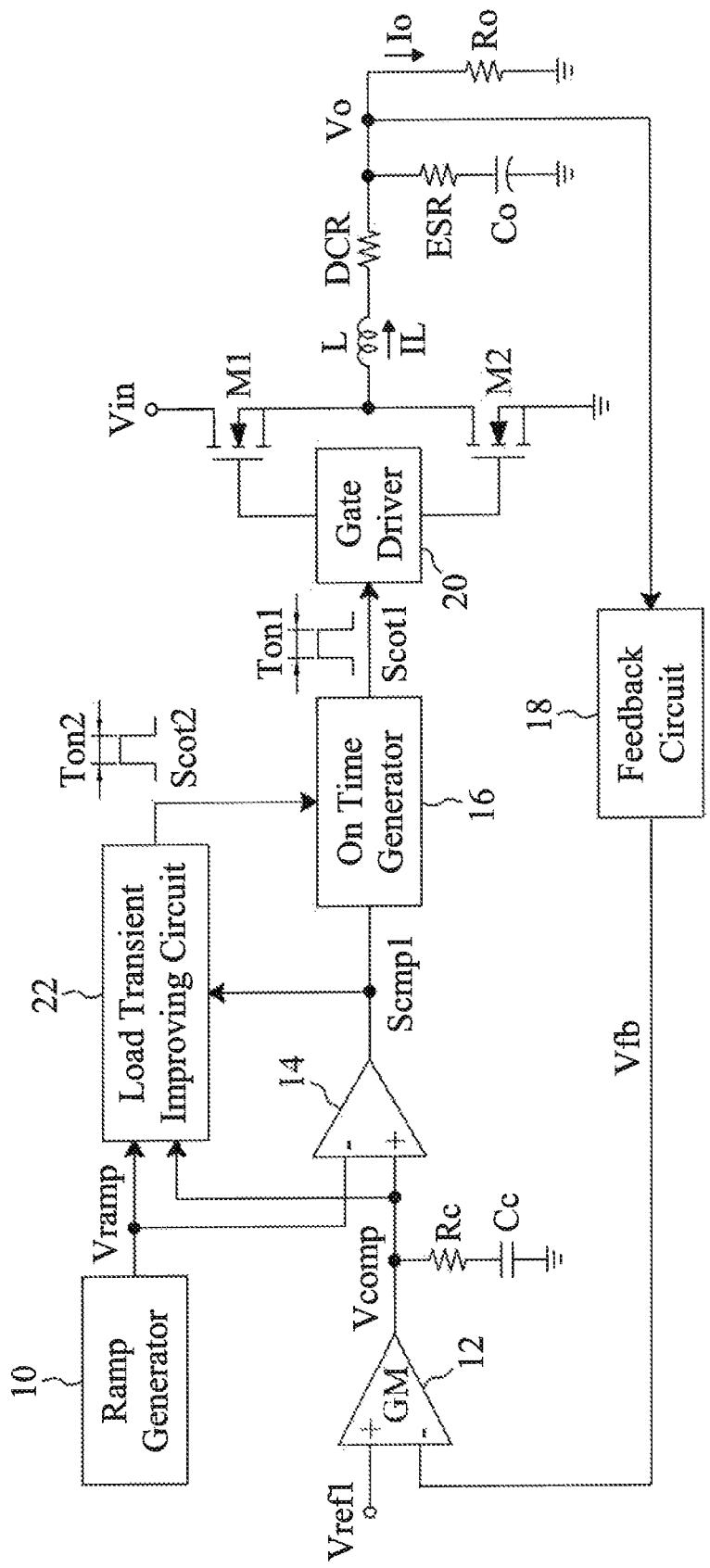
FIG. 2 shows a first embodiment of a COT mode power supply according to the present invention.

FIG. 2 shows a first embodiment of a COT mode power supply according to the present invention, which includes a load transient improving circuit 22 in addition to the components shown in FIG. 1. The load transient improving circuit 22 detects the load condition (Ro) based on the ramp signal Vramp, the error signal Vcomp, and the comparison signal Scmp1, and when a load variation causes the output voltage Vo to droop, the load transient improving circuit 22 generates a longer constant on time Ton2 than the original Ton1 which is generated by the on time generator 16 before the load variation, such that the longer constant on time Ton2 is provided to the gate driver 20 instead. The longer constant on time Ton2 provided to the gate driver 20 means that the conductive time of the switch M1 will be longer and, therefore, the power source Vin will provide more energy to the output terminal Vo to prevent the output voltage Vo from undershooting, which will also shorten the time from the load variation to stabilization of the output voltage Vo.

Figure 3:
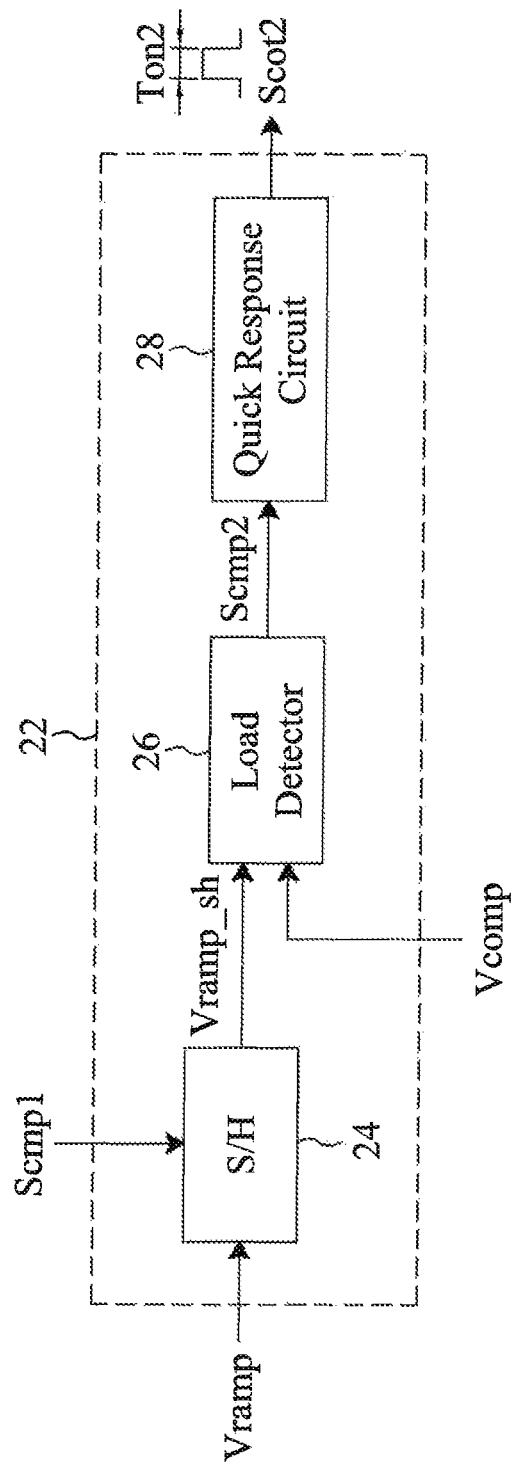
FIG. 3 shows a first embodiment for the load transient improving circuit shown in FIG. 2.
Figure 4:
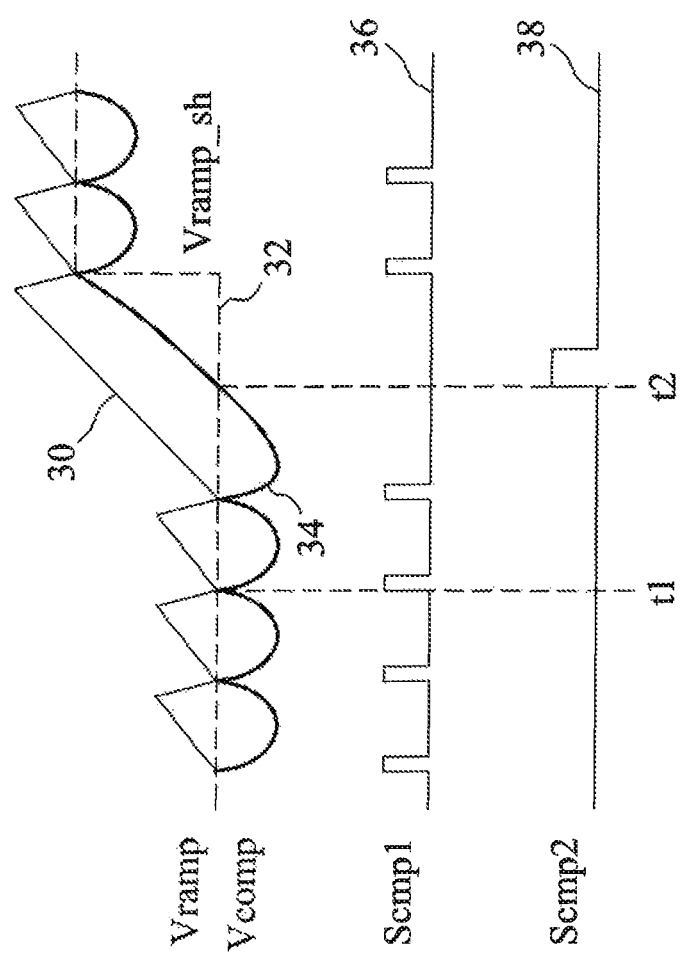
FIG. 4 is a timing diagram of the load transient improving circuit shown in FIG. 3.

FIG. 3 shows a first embodiment for the load transient improving circuit 22 shown in FIG. 2, which includes a sample and hold circuit 24 to sample the ramp signal Vramp responsive to the comparison signal Scmp1 to generate a sampled signal Vramp_sh, a load detector 26 to compare the error signal Vcomp with the sampled signal Vramp_sh to identify the load condition and assert a detection signal Scmp2 when the error signal Vcomp is greater than the sampled signal Vramp_sh, and a quick response circuit 28 to generate the second constant on time Ton2 responsive to the detection signal Scmp2. FIG. 4 is a timing diagram of the circuit shown in FIG. 3, in which waveform 30 represents the ramp signal Vramp, waveform 32 represents the sampled signal Vramp_sh, waveform 34 represents the error signal Vcomp, waveform 36 represents the comparison signal Scmp1, and waveform 38 represents the detection signal Scmp2. Referring to FIGS. 2-4, when the error signal Vcomp becomes equal to the ramp signal Vramp, the comparator 14 asserts the comparison signal Scmp1, for example, as shown by the waveforms 30, 34, and 36 at time t1, and responsive to the comparison signal Scmp1 the sample and hold circuit 24 samples the ramp signal Vramp to generate the sampled signal Vramp_sh as shown by the waveform 32. The sampled signal Vramp_sh can be stored in a small capacitor to be sent to the load detector 26 in next cycle, and the load detector 26 can detect the load condition by comparing the sampled signal Vramp_sh and the error signal Vcomp. Under normal operation, the error signal Vcomp is smaller than or equal to the sampled signal Vramp_sh, and the load detector 26 would not assert the detection signal Scmp2. When the load variation causes the output voltage Vo to droop, the error signal Vcomp will be greater than the sampled signal Vramp_sh, for example, as shown by the waveforms 32 and 34 at time t2, causing the load detector 26 to assert the detection signal Scmp2 and thereby the quick response circuit 28 to generate the constant on time Ton2. The dynamic valley of the ramp signal Vramp is determined by the error signal Vcomp; therefore, regardless whether the load Ro varies or the input voltage Vin or the output voltage Vo changes, the load transient improving circuit 22 always can prevent the output voltage Vo from undershooting.

In other embodiments, the compensator 12 shown in FIG. 2 may be configured to have its inverting terminal and non-inverting terminal to receive the reference value Vref1 and the feedback signal Vfb, respectively, and in this condition the comparator 14 is configured to have its inverting terminal and non-inverting terminal to receive the error signal Vcomp and the ramp signal Vramp, respectively, and the load detector 26 would assert the detection signal Scmp2 when the error signal Vcomp is smaller than the sampled signal Vramp_sh.

Figure 5:
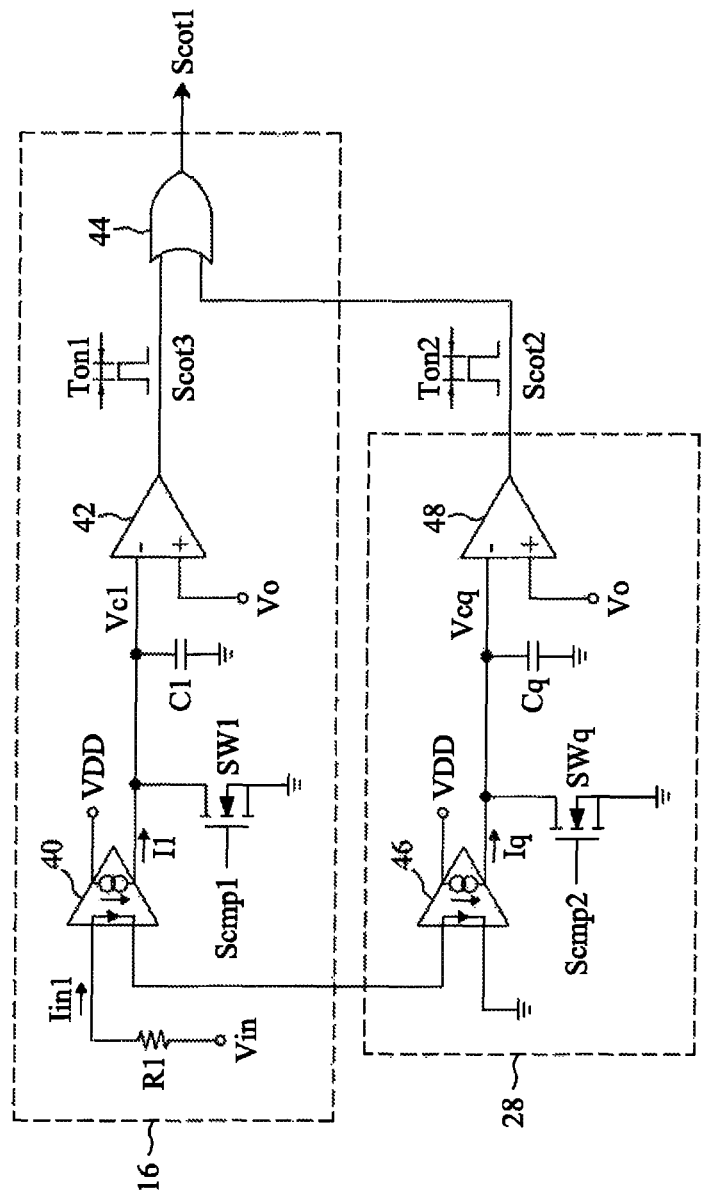
FIG. 5 shows an embodiment for the on time generator and the quick response circuit to achieve constant frequency COT control.

FIG. 5 shows an embodiment for the on time generator 16 and the quick response circuit 28 to achieve constant frequency COT control. In the quick response circuit 28, according to a current Iin1=Vin/R1, a current convertor 46 provides a current Iq which is thus related to the input voltage Vin to charge a capacitor Cq, a switch SWq is connected in parallel with the capacitor Cq and controlled by the detection signal Scmp2, and a comparator 48 compares the output voltage Vo with the voltage Vcq of the capacitor Cq to generate the constant on time Ton2. In the on time generator 16, according to the current Iin1, a current convertor 40 provides a current I1 which is thus related to the input voltage Vin to charge a capacitor C1, a switch SW1 is connected in parallel with the capacitor C1 and controlled by the comparison signal Scmp1, a comparator 42 compares the output voltage Vo with the voltage Vc1 of the capacitor C1 to generate the constant on time Ton1 which is shorter than the constant on time Ton2, and an OR gate 44 generates the signal Scot1 responsive to the outputs Scot2 and Scot3 of the comparators 42 and 48. When the comparator 14 asserts the comparison signal Scmp1, the switch SW1 in the on time generator 16 is turned on and thus discharges the capacitor C1, causing the voltage Vc1 lower than the output voltage Vo and thereby triggering the constant on time Ton1. After the switch SW1 is turned off, the current I1 would charge the capacitor C1, causing the voltage Vc1 to increase, and when the voltage Vc1 becomes greater than the output voltage Vo, the constant on time Ton1 terminates. When it is not under load transient, the switch SWq in the quick response circuit 28 is kept off and the capacitor Cq is continuously charged to cause the voltage Vcq higher than the output voltage Vo, during which the on time generator 16 would output the constant on time Ton1. While load transient causes the error signal Vcomp to be greater than the sampled signal Vramp_sh, the load detector 26 asserts the detection signal Scmp2 and thus turns on the switch SWq in the quick response circuit 28, thereby discharging the capacitor Cq and causing the voltage Vcq to be lower than the output voltage Vo, thereby triggering the constant on time Ton2. When the switch SWq is turned off, the current Iq would charge the capacitor Cq, and when the voltage Vcq becomes greater than the output voltage Vo, the constant on time Ton2 terminates. Therefore, the on time generator 16 outputs the constant on time Ton2 such that the time for the switch M1 to be on is longer for preventing the output voltage Vo from undershooting.

Figure 6:
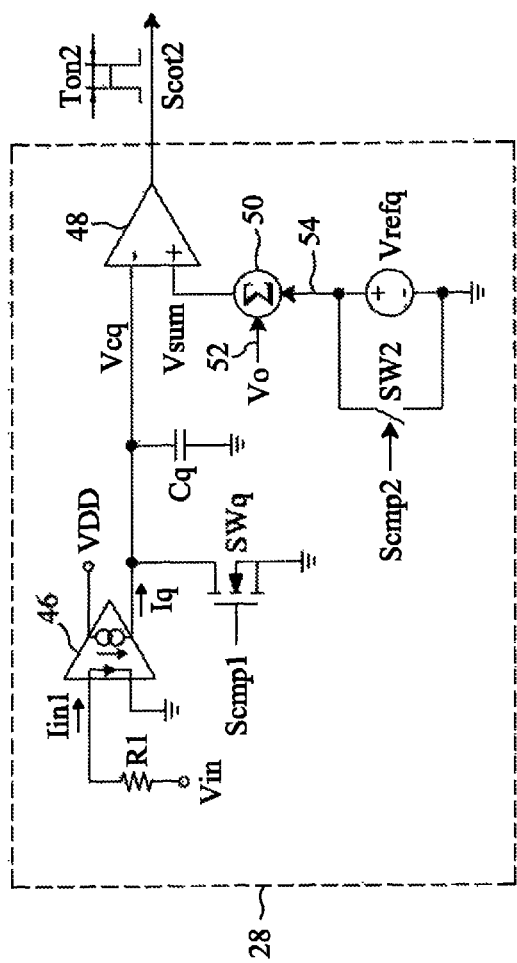
FIG. 6 shows a second embodiment for the quick response circuit to achieve constant frequency COT control.

FIG. 6 shows a second embodiment for the quick response circuit 28 to achieve constant frequency COT control, which also includes the current convertor 46, the switch SWq, the capacitor Cq, and the comparator 48 as those of FIG. 5. However, the switch SWq is controlled by the comparison signal Scmp1. The quick response circuit 28 shown in FIG. 6 further includes a summing circuit 50, a voltage source Vrefq, and a switch SW2. The summing circuit 50 combines the voltages of its input terminals 52 and 54 to generate a summed voltage Vsum applied to the non-inverting input terminal of the comparator 48, and the input terminal 52 of the summing circuit 50 receives the output voltage Vo. The voltage source Vrefq is connected between the input terminal 54 of the summing circuit 50 and a ground terminal, and the switch SW2 is connected in parallel with the voltage source Vrefq and controlled by the detection signal Scmp2. When it is not under load transient, the switch SW2 is on to bypass the voltage source Vrefq, and thus Vsum=Vo. When the comparator 14 asserts the comparison signal Scmp1, the switch SWq is turned on and thus discharges the capacitor Cq, causing the voltage Vcq to be lower than the summed voltage Vsum and thereby triggering the constant on time Ton2. After the switch SWq is turned off, the current Iq would charge the capacitor Cq, causing the voltage Vcq to increase, and when the voltage Vcq becomes greater than the summed voltage Vsum, the constant on time Ton2 terminates. By setting at least one of the current Iq and the capacitor Cq, the constant on time Ton2 in this case is shorter than or equal to Ton1. When load transient occurs and causes the error signal Vcomp to be greater than the sampled signal Vramp_sh, the switch SW2 is turned off by the detection signal Scmp1, and thus Vsum=Vo+Vrefq, by which the constant on time Ton2 is increased to be greater than Ton1.

Figure 7:
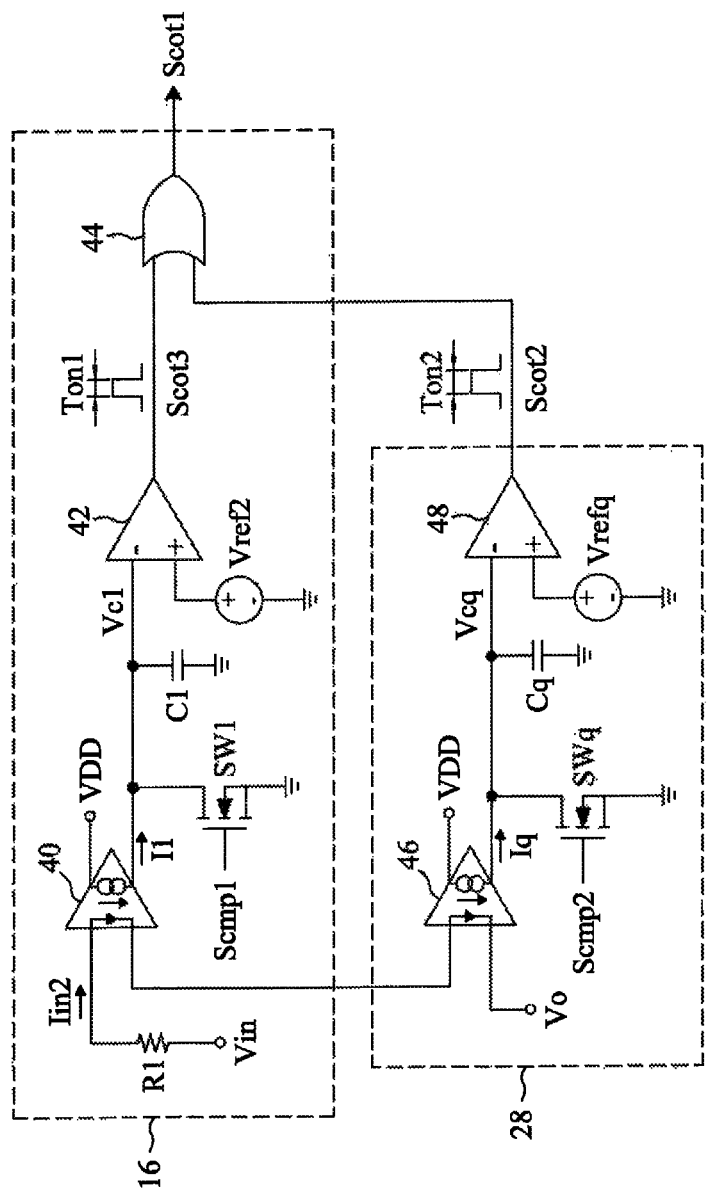
FIG. 7 shows an embodiment for the on time generator and the quick response circuit to achieve constant current ripple COT control.

FIG. 7 shows an embodiment for the on time generator 16 and the quick response circuit 28 to achieve constant current ripple (CCR) COT control, in which the on time generator 16 has similar circuit to that of shown in FIG. 5, while the current converter 40 provides a current I1 according to a current Iin2=(Vin−Vo)/R1, which is thus related to the difference between the input voltage Vin and the output voltage Vo, and the comparator 42 compares the voltage Vc1 of the capacitor C1 with a reference value Vref2 to generate the constant on time Ton1. The quick response circuit 28 also has similar circuit to that of shown in FIG. 5, while the current convertor 46 provides a current Iq according to the current Iin2, which is thus related to the difference between the input voltage Vin and the output voltage Vo, and the comparator 48 compares the voltage Vcq of the capacitor Cq with a reference value Vrefq to generate the constant on time Ton2 which is longer than the constant on time Ton1 generated by the comparator 42.

Figure 8:
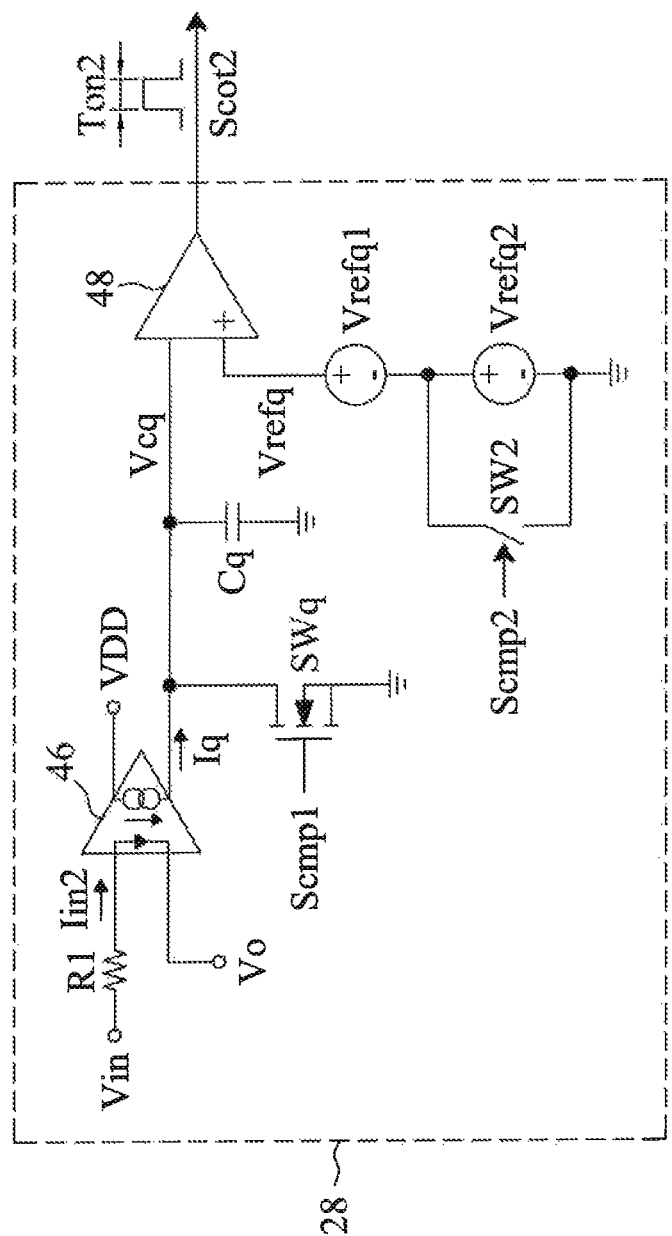
FIG. 8 shows a second embodiment for the quick response circuit to achieve constant current ripple COT control.

FIG. 8 shows a second embodiment for the quick response circuit 28 to achieve constant current ripple (CCR) COT control, which includes the current convertor 46, the switch SWq, the capacitor Cq, and the comparator 48 as those of FIG. 7, while the switch SWq is controlled by the comparison signal Scmp1. Furthermore, the quick response circuit 28 shown in FIG. 8 further includes voltage sources Vrefq1 and Vrefq2 and a switch SW2. The voltage sources Vrefq1 and Vrefq2 are connected in series between the non-inverting input terminal of the comparator 48 and a ground terminal, and the switch SW2 is connected in parallel with the voltage source Vrefq2. When it is not under load transient, the switch SW2 is on to bypass the voltage source Vrefq2, and thus the voltage Vrefq at the non-inverting input terminal of the comparator 48 is equal to Vrefq1. When the comparator 14 asserts the comparison signal Scmp1, the switch SWq is turned on and thus discharges the capacitor Cq, causing the voltage Vcq to be lower than the voltage Vrefq, thereby triggering the constant on time Ton2. After the switch SWq is turned off, the current Iq would charge the capacitor Cq, causing the voltage Vcq to increase, and when the voltage Vcq becomes greater than the voltage Vrefq, the constant on time Ton2 terminates. By setting at least one of the current Iq, capacitor Cq, and the voltage source Vrefq1, the constant on time Ton2 in this case is shorter than or equal to Ton1. When load transient occurs and causes the error signal Vcomp to be greater than the sampled signal Vramp_sh, the detection signal Scmp2 would turn off the switch SW2, and thus the voltage Vrefq at the non-inverting input terminal of the comparator 48 is equal to Vrefq1+Vrefq2, which will increase the constant on time Ton2 to be greater than Ton1.

Figure 9:
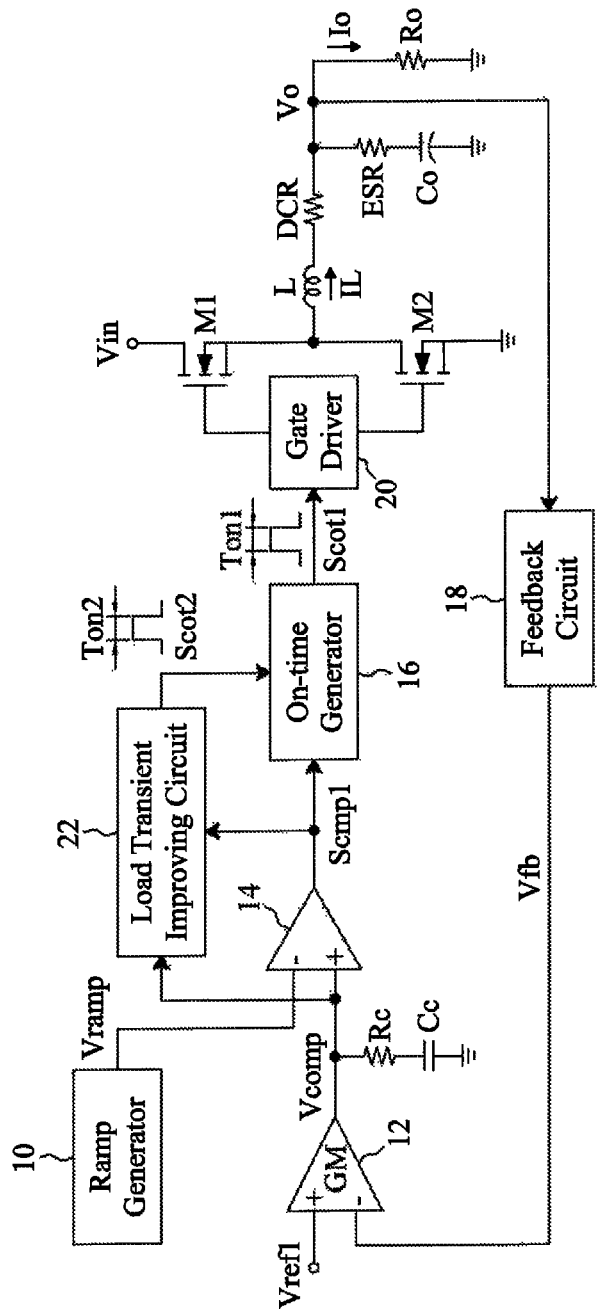
FIG. 9 shows a second embodiment of a COT mode power supply according to the present invention.
Figure 10:
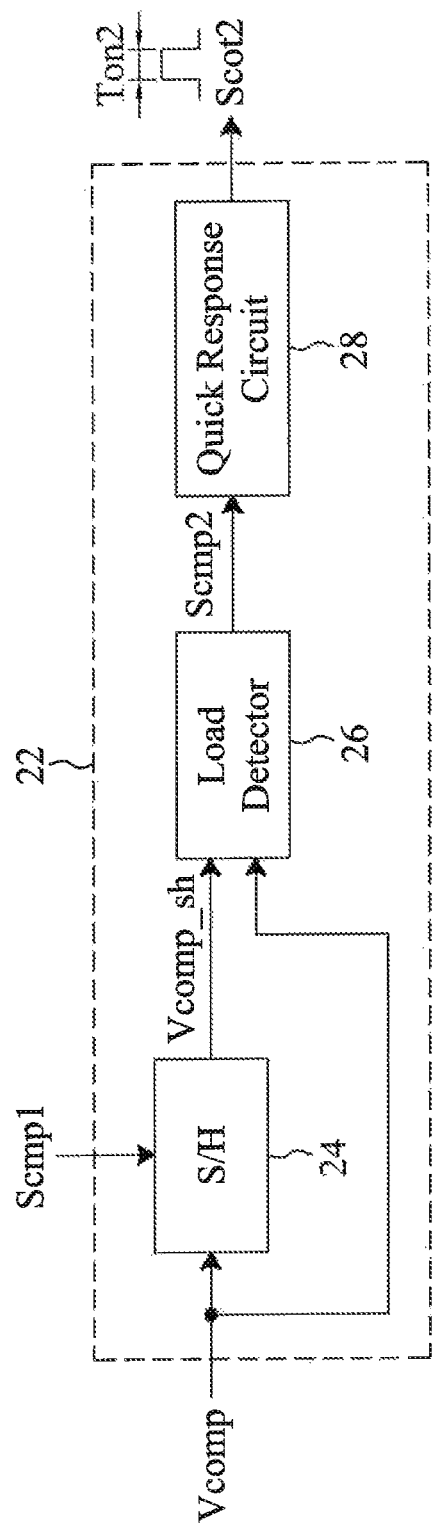
FIG. 10 shows an embodiment for the load transient improving circuit shown in FIG. 9.

FIG. 9 shows a second embodiment of a COT mode power supply according to the present invention, which includes components identical to the ones of the circuit shown in FIG. 2, except that the load transient improving circuit 22 generates the constant on time Ton2 responsive to the error signal Vcomp and the comparison signal Scmp1. FIG. 10 is an embodiment for the load transient improving circuit 22 shown in FIG. 9, which has the same circuit as that of FIG. 3, while it is the error signal Vcomp to be sampled by the sample and hold circuit 24, and the load detector 26 asserts the detection signal Scmp2 by comparing the sampled signal Vcomp_sh with the error signal Vcomp. When load variation causes the error signal Vcomp to be greater than the sampled signal Vcomp_sh, the load detector 26 asserts the detection signal Scmp2 and thus triggers the quick response circuit 28 to generate the constant on time Ton2 such that the time for the switch M1 to be on is longer to prevent the output voltage Vo from undershooting and to shorten the time for the output voltage Vo to become stable again. The structure of the quick response circuit 28 shown in FIG. 10 may refer to the embodiments shown in FIGS. 5-8.

Figure 11:
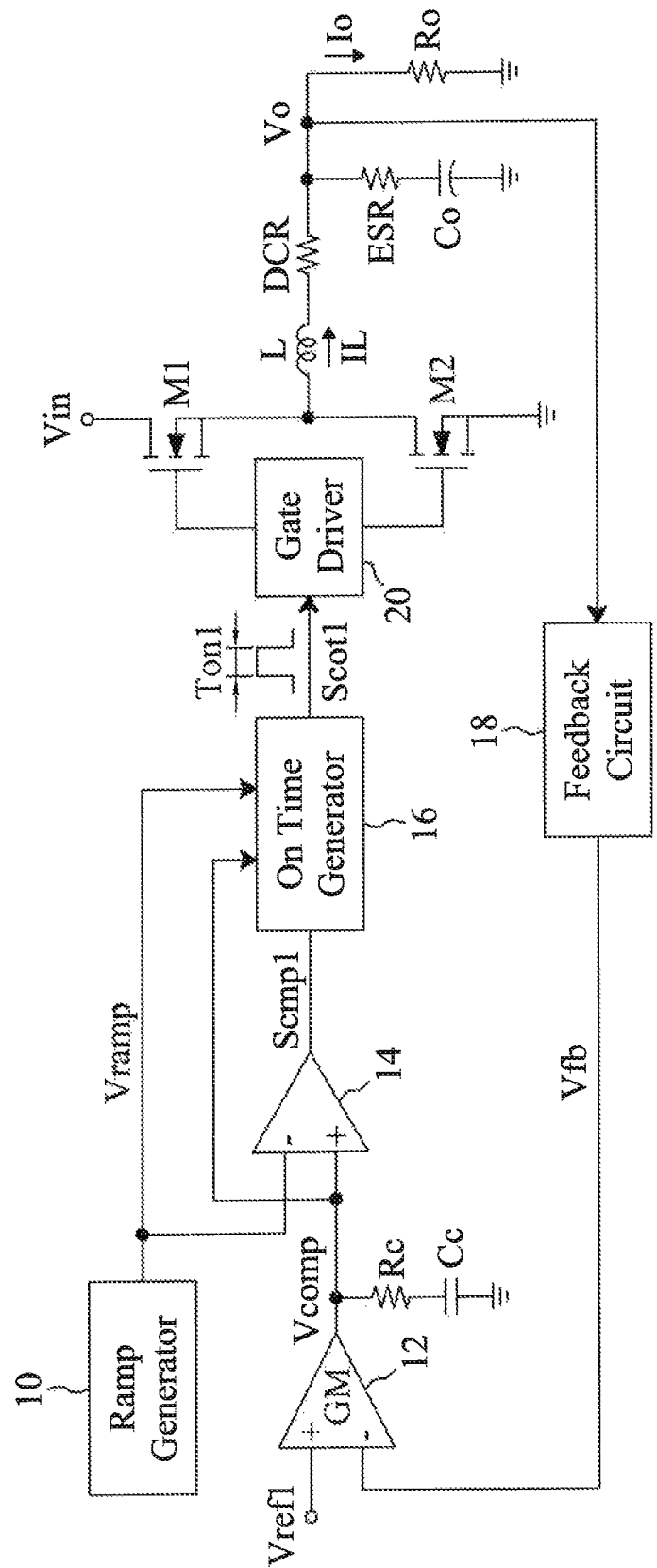
FIG. 11 shows a third embodiment of a COT mode power supply according to the present invention.

The load transient improving circuit 22 shown in FIGS. 2 and 9 may be combined with the on time generator 16. FIG. 11 shows a third embodiment of a COT mode power supply according to the present invention, which has components identical to the ones of the circuit shown in FIG. 1, while the on time generator 16 not only triggers the constant on time Ton1 responsive to the comparison signal Scmp1 but also detects load variation based on the ramp signal Vramp, the error signal Vcomp, and the comparison signal Scmp1. When load variation causes the output voltage Vo to droop, the on time generator 16 shown in FIG. 11 would increase the pulse width of the constant on time Ton1 to prevent the output voltage Vo from undershooting and also to shorten the time for the output voltage Vo to be stable again.

Figure 12:
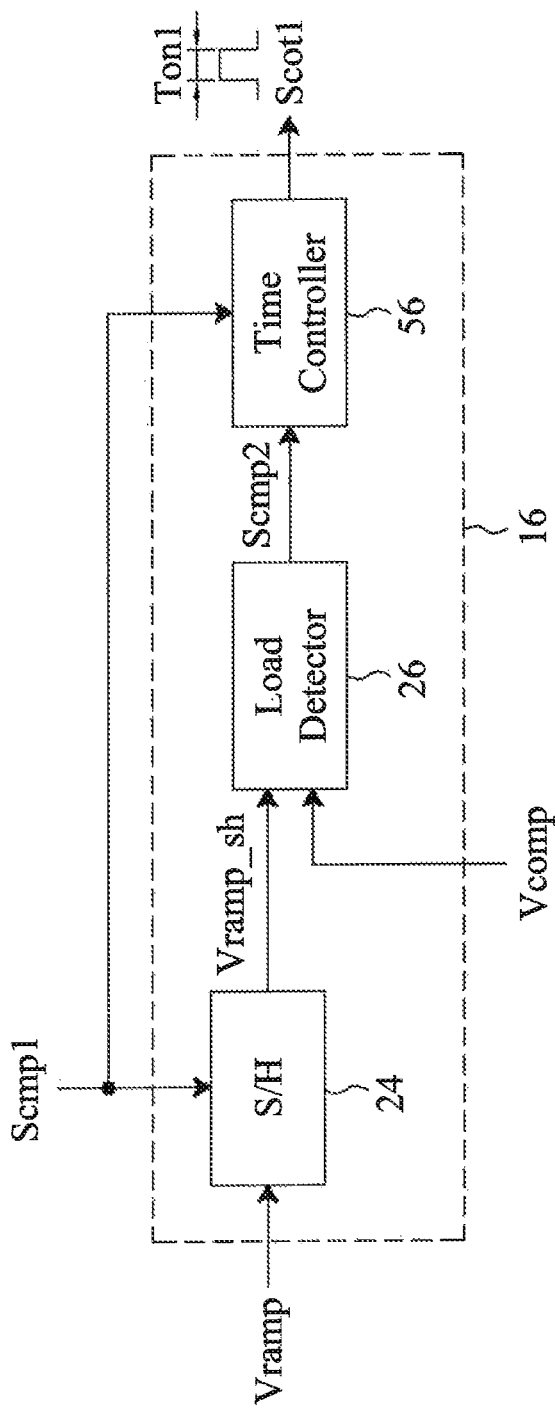
FIG. 12 shows a first embodiment for the on time generator shown in FIG. 11.

FIG. 12 shows an embodiment for the on time generator 16 shown in FIG. 11, which includes a sample and hold circuit 24, a load detector 26, and a time controller 56. The operation of the sample and hold circuit 24 and the load detector 26 shown in FIG. 12 is identical to that of the circuit shown in FIG. 3. The time controller 56 triggers the constant on time Ton1 responsive to the comparison signal Scmp1, and increases the pulse width of the constant on time Ton1 responsive to the detection signal Scmp2 provided by the load detector 26 when load variation causes the output voltage Vo to droop.

Figure 13:
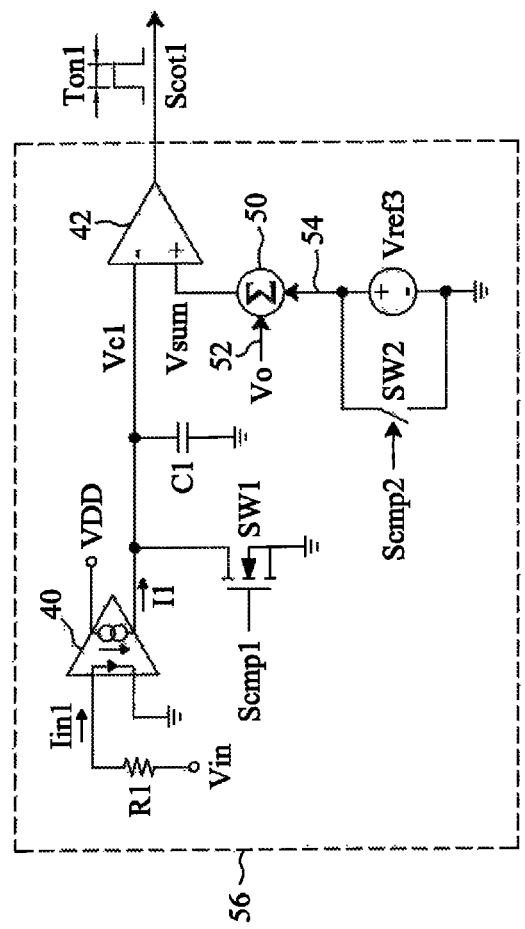
FIG. 13 shows an embodiment for the on time generator shown in FIG. 12 in a constant frequency mode.

FIG. 13 shows an embodiment for the time controller 56 shown in FIG. 12 in constant frequency mode, in which a current convertor 40 provides a current I1 responsive to a current Iin1 which is related to the input voltage Vin to charge the capacitor C1, a switch SW1 is connected in parallel with the capacitor C1 and controlled by the comparison signal Scmp1, a summing circuit 50 combines the voltages of its input terminals 52 and 54 to generate a summed voltage Vsum, the input terminal 52 of the summing circuit 50 receives the output voltage Vo, a voltage source Vref3 is connected between the input terminal 54 of the summing circuit 50 and a ground terminal, a switch SW2 is connected in parallel with the voltage source Vref3 and controlled by the detection signal Scmp2, and a comparator 42 compares the voltage Vc1 of the capacitor C1 with the summed voltage Vsum to generate the constant on time Ton1. When it is not under load transient, the switch SW2 is on to bypass the voltage source Vref3, and thus Vsum=Vo. When the comparator 14 asserts the comparison signal Scmp1, the switch SW1 is turned on and thus discharges the capacitor C1, causing the voltage Vc1 to be lower than the summed voltage Vsum, thereby triggering the constant on time Ton1. After the switch SW1 is turned off, the current I1 would charge the capacitor C1 and thus cause the voltage Vc1 to increase, and when the voltage Vc1 becomes greater than the summed voltage Vsum, the constant on time Ton1 terminates. When load transient occurs to cause the error signal Vcomp to be greater than the sampled signal Vramp_sh, the detection signal Scmp2 turns on the switch SW2, and thus Vsum=Vo+Vref3. As a result, the voltage Vc1 of the capacitor C1 requires longer time to reach the summed voltage Vsum, and thus the pulse width of the constant on time Ton1 is increased. In this embodiment, the detection signal Scmp2 increase the pulse width of the constant on time Ton1 by adjusting the voltage Vsum at the non-inverting input terminal of the comparator 42; while in other embodiments, the detection signal Scmp2 may adjust at least one of the current I1, capacitor C1, and the voltage Vsum to increase the pulse width of the constant on time Ton1.

Figure 14:
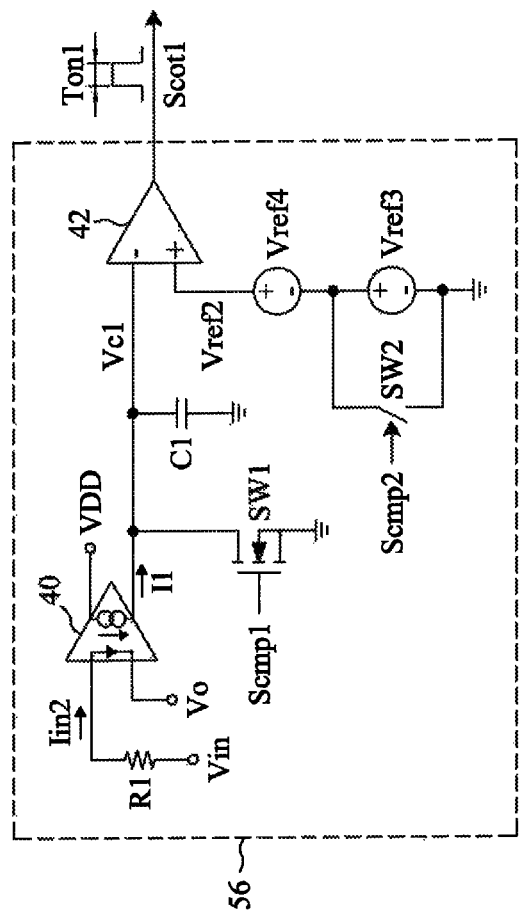
FIG. 14 shows an embodiment for the on time generator shown in FIG. 12 in a constant current ripple mode.

FIG. 14 shows an embodiment for the time controller 56 shown in FIG. 12 in constant current ripple (CCR) mode, in which a current convertor 40 provides a current I1 responsive to the current Iin2 which is related to the difference between the input voltage Vin and the output voltage Vo to charge a capacitor C1, a switch SW 1 is connected in parallel with the capacitor C1 and controlled by the comparison signal Scmp1, voltage sources Vref3 and Vref4 are connected in series between the non-inverting input terminal of a comparator 42 and a ground terminal, a switch SW2 is connected in parallel with the voltage source Vref3 and controlled by the detection signal Scmp2, the capacitor C1 provides the voltage Vc1 to the inverting terminal of the comparator 42, and the comparator 42 generates the constant on time Ton1 by comparing the voltages of the two input terminals thereof. When it is not under load transient, the switch SW2 is on to bypass the voltage source Vref3, and Thus the voltage Vref2 at the non-inverting terminal of the comparator 42 is equal to Vref4. When the comparator 14 asserts the comparison signal Scmp1, the switch SW1 is turned on and thus discharges the capacitor C1, causing the voltage Vc1 to be lower than the voltage Vref2, thereby triggering the constant on time Ton1. When the switch SW1 is turned off, the current I1 would charge the capacitor C1 and cause the voltage Vc1 to increase, and when the voltage Vc1 becomes greater than the voltage Vref2, the constant on time Ton1 terminates. When load transient occurs to cause the error signal Vcomp to be greater than the sampled signal Vramp_sh, the detection signal Scmp2 turns off the switch SW2, and thus the voltage Vref2 at the non-inverting input terminal of the comparator 42 is equal to Vref3+Vref4. As a result, the voltage Vc1 of the capacitor C1 requires longer time to reach the voltage Vref2, and thus the pulse width of the constant on time Ton1 is increased. In this embodiment, the detection signal Scmp2 adjusts the voltage Vref2 at the non-inverting terminal of the comparator 42 to increase the pulse width of the constant on time Ton1; while in other embodiments, the detection signal Scmp2 may adjust at least one of the current I1, the capacitor C1, and the voltage Vref2 to increase the pulse width of the constant on time Ton1.

Figure 15:
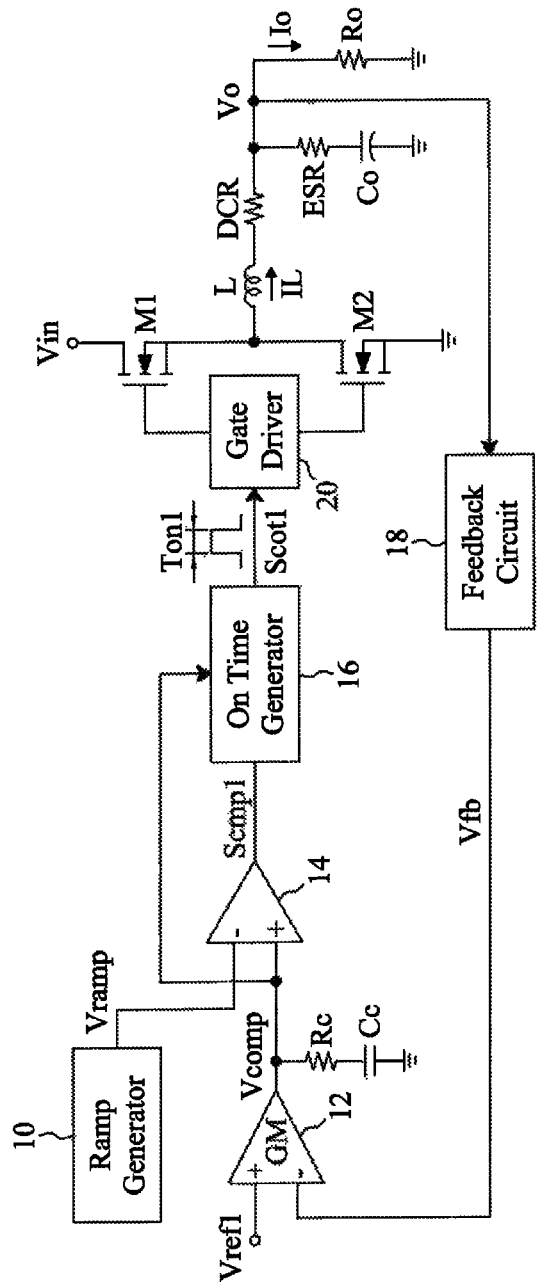
FIG. 15 shows a fourth embodiment of a COT mode power supply according to the present invention.

FIG. 15 shows a fourth embodiment of a COT mode power supply according to the present invention, which has components identical to the ones of the circuit shown in FIG. 1, while the on time generator 16 not only triggers the constant on time Ton1 responsive to the comparison signal Scmp1 but also detects load variation responsive to the error signal Vcomp and the comparison signal Scmp1. When load variation causes the output voltage Vo to droop, the on time generator 16 shown in FIG. 15 would increase the pulse width of the constant on time Ton1 to prevent the output voltage Vo from undershooting and also to shorten the time for the output voltage Vo to become stable again.

Figure 16:
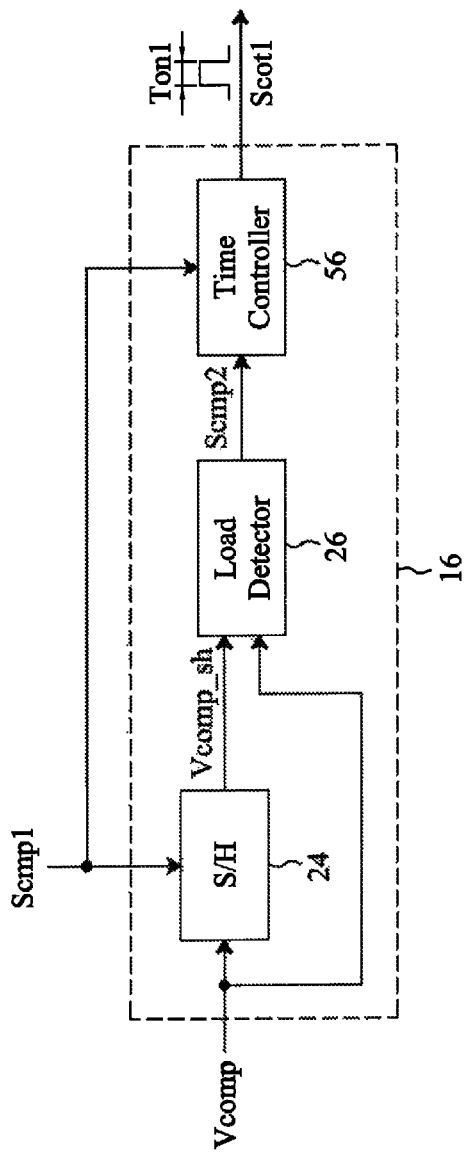
FIG. 16 shows an embodiment for the on time generator shown in FIG. 15.

FIG. 16 shows an embodiment for the on time generator 16 shown in FIG. 15, which includes the sample and hold circuit 24, the load detector 26, and the time controller 56 as shown in FIG. 12. The time controller 56 triggers the constant on time Ton1 responsive to the comparison signal Scmp1. The sample and hold circuit 24 samples the error signal Vcomp responsive to the comparison signal Scmp1 to generate the sampled signal Vcomp_sh. The load detector 26 detects the load condition responsive to the sampled signal Vcomp_sh and the error signal Vcomp. When load transient occurs to cause the error signal Vcomp to be greater than the sampled signal Vcomp_sh, the load detector 26 asserts the detection signal Scmp2 for the time controller 56 to increase the pulse width of the constant on time Ton1. The structure of the time controller 56 shown in FIG. 16 is the same as that shown in FIGS. 13 and 14.

Figure 17:
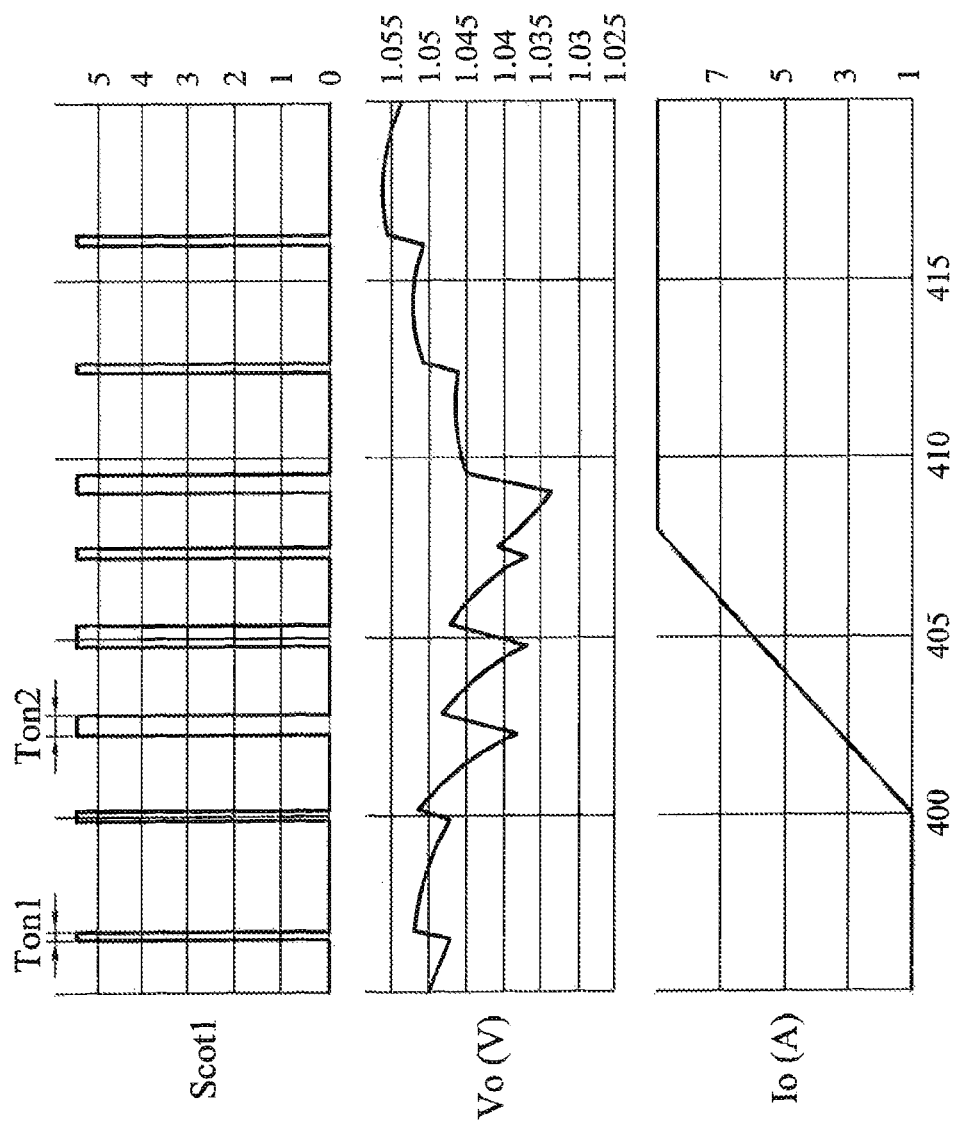
FIG. 17 shows a simulation result of a COT mode power supply according to the present invention.
Figure 18:
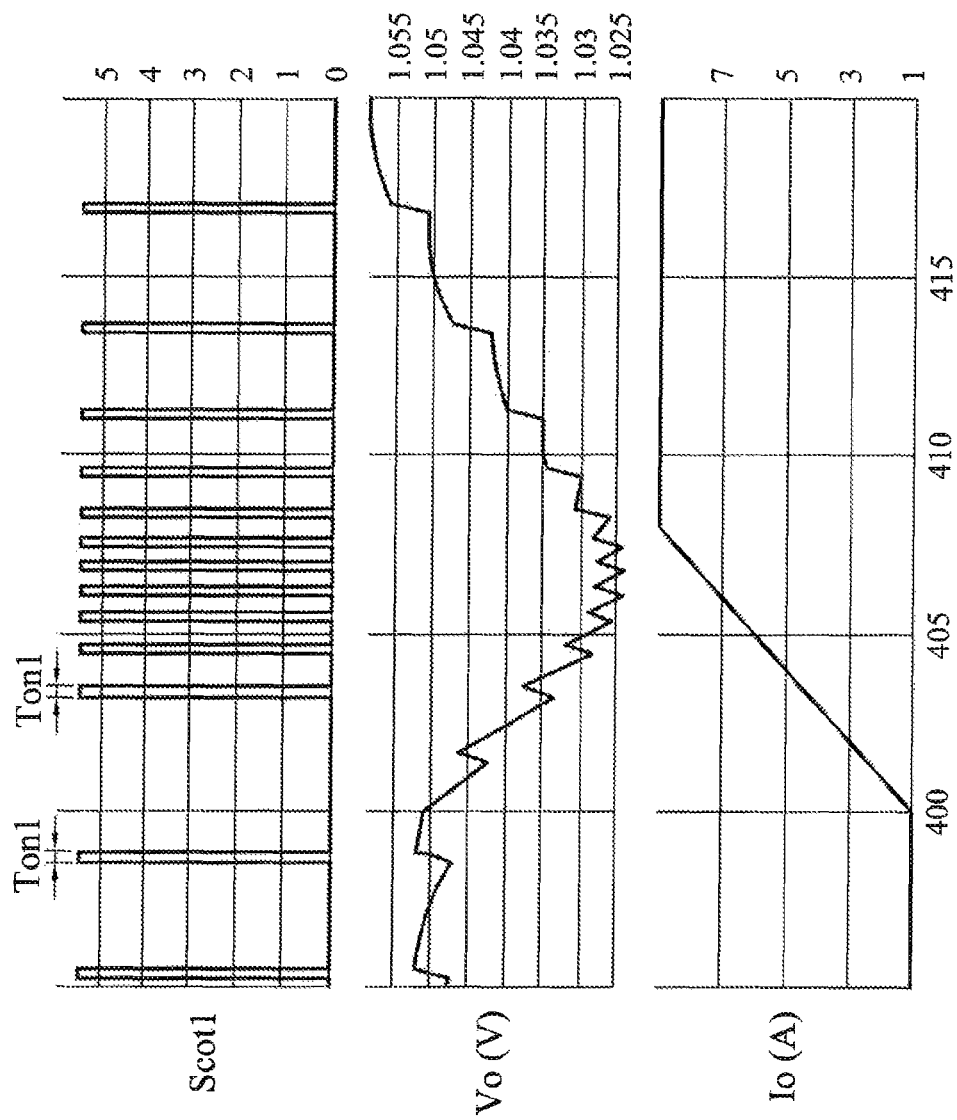
FIG. 18 shows a simulation result of a traditional COT mode power supply.

FIG. 17 shows a simulation result of a COT mode power supply according to the present invention and FIG. 18 shows a simulation result of a traditional COT mode power supply, in which the simulation parameters of the two are identical to each other. Referring to FIG. 17, during load transient, since the COT mode power supply according to the present invention can increase the pulse width of the constant on time, the lowest point of the output voltage Vo is approximately 1.035V. Referring to FIG. 18, the pulse width of the constant on time of the traditional COT mode power supply remains unchanged during load transient, which leads to the lowest point of the output voltage Vo to be approximately 1.025V. It is therefore shown that the present invention can indeed prevent the output voltage Vo from undershooting.

Figure 19:
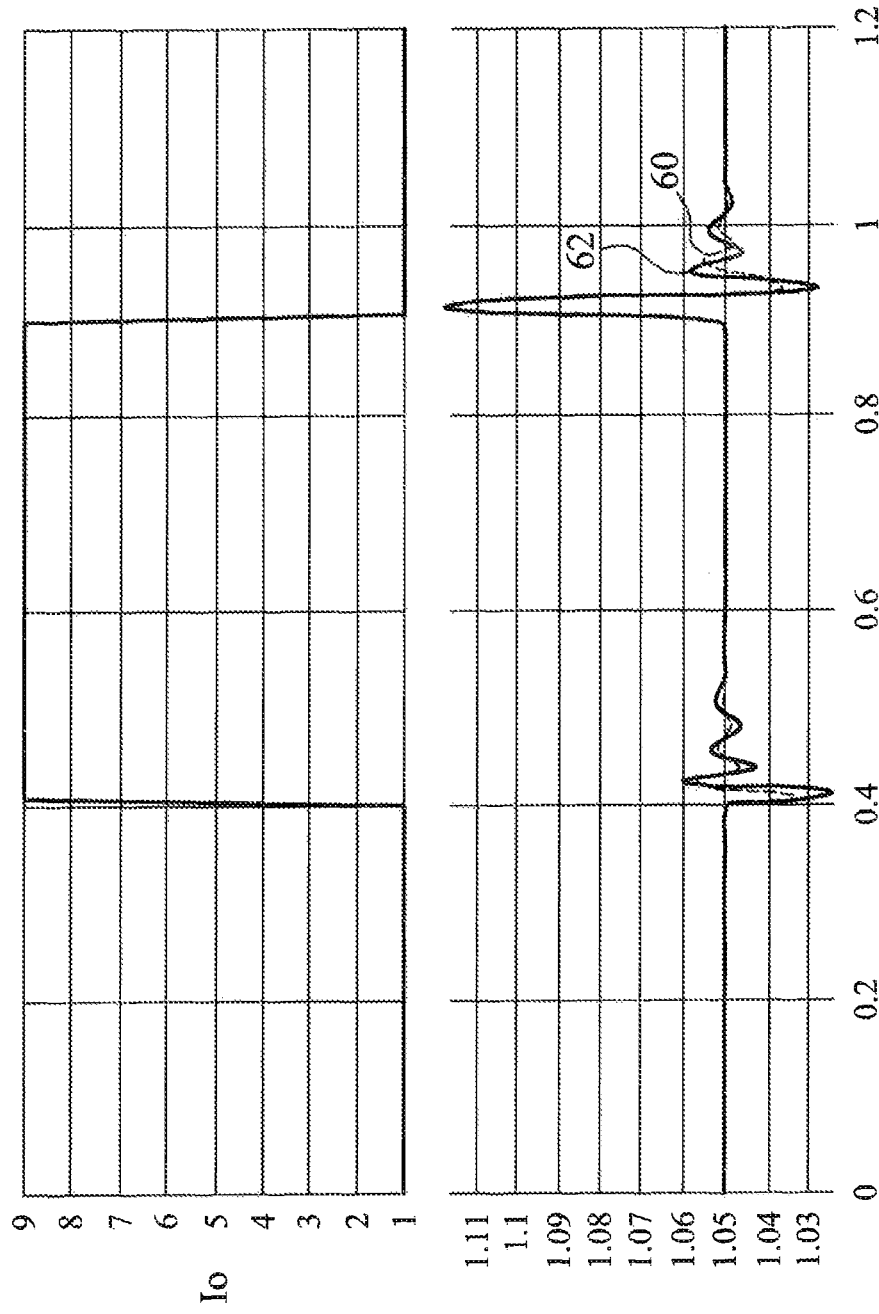
FIG. 19 shows a simulation result of a COT mode power supply according to the present invention and of a traditional COT mode power supply under load transient.

FIG. 19 shows simulation results of a COT mode power supply according to the present invention and a traditional COT mode power supply during load transient, in which waveform 60 represents the output voltage Vo of the COT mode power supply according to the present invention, and waveform 62 represents the output voltage Vo of the traditional COT mode power supply. It can be seen from FIG. 19 that with identical simulation parameters, the present invention is able to reduce the droop of the output voltage Vo no matter the load changes from light to heavy or from heavy to light, and is able to recover the output voltage Vo much quicker.

A COT mode power supply according to the present invention can prevents the output voltage form undershooting and shortens the time for the output voltage to recover table. Furthermore, in comparison to the traditional solution of increasing the capacitance Co, the COT mode power supply according to the present invention requires lower costs.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A constant on time (COT) mode power supply, comprising:
   a feedback circuit detecting an output voltage of the COT mode power supply to generate a feedback signal;
   a compensator connected to the feedback circuit, and generating an error signal responsive to a difference between the feedback signal and a reference value;
   a ramp generator providing a ramp signal;
   a comparator connected to the compensator and the ramp generator, and comparing the error signal with the ramp signal to generate a comparison signal;
   an on time generator connected to the comparator, and triggering a first constant on time responsive to the comparison signal for regulating the output voltage; and
   a load transient improving circuit connected to the comparator, detecting a load condition based on the ramp signal, the error signal and the comparison signal, and generating a second constant on time for regulating the output voltage when the output voltage is drooped due to a load variation, to thereby prevent the output voltage from undershooting.

2. The COT mode power supply of claim 1, wherein the second constant on time is longer than the first constant on time.

3. The COT mode power supply of claim 1, wherein the load transient improving circuit comprises:
   a sample and hold circuit connected to the ramp generator and the comparator, and sampling the ramp signal responsive to the comparison signal to generate a sampled signal;
   a load detector connected to the sample and hold circuit and the compensator, comparing the error signal with the sampled signal to identify the load condition, and asserting a detection signal when the error signal is greater than the sampled signal; and
   a quick response circuit connected to the load detector, and generating the second constant on time responsive to the detection signal.

4. The COT mode power supply of claim 3, wherein the quick response circuit comprises:
   a capacitor;
   a switch connected in parallel with the capacitor, to discharge the capacitor when turned on by the detection signal;
   a current converter connected to the capacitor, and providing a current which is related to an input voltage of the COT mode power supply to charge the capacitor; and
   a second comparator connected to the capacitor, and comparing a voltage of the capacitor with the output voltage to generate the second constant on time.

5. The COT mode power supply of claim 3, wherein the quick response circuit comprises:
   a capacitor;
   a first switch connected in parallel with the capacitor, to discharge the capacitor when turned on by the detection signal;
   a current converter connected to the capacitor, and providing a current which is related to an input voltage of the COT mode power supply to charge the capacitor;
   a summing circuit combining voltages of input terminals thereof to generate a summed voltage, wherein a first one of the input terminals of the summing circuit receives the output voltage;
   a voltage source connected between a second one of the input terminals of the summing circuit and a ground terminal;
   a second switch connected in parallel with the voltage source, and controlled by the detection signal; and
   a second comparator connected to the capacitor and the summing circuit, and comparing a voltage of the capacitor with the summed voltage to generate the second constant on time.

6. A method for improving load transient of a constant on time (COT) mode power supply, the method comprising the steps of:
   A) detecting an output voltage of the COT mode power supply to generate a feedback signal;
   B) generating an error signal responsive to a difference between the feedback signal and a reference value;
   C) comparing the error signal with the ramp signal to generate a comparison signal;
   D) triggering a first constant on time responsive to the comparison signal for regulating the output voltage; and
   E) detecting a load condition based on the ramp signal, the error signal and the comparison signal, and generating a second constant on time for regulating the output voltage when the output voltage is drooped due to a load variation, to thereby prevent the output voltage from undershooting.

7. The method of claim 6, wherein the second constant on time is longer than the first constant on time.

8. The method of claim 6, wherein the step E comprises the steps of:
   sampling the ramp signal responsive to the comparison signal to generate a sampled signal;
   comparing the error signal with the sampled signal to identify the load condition, and asserting a detection signal when the error signal is greater than the sampled signal; and
   generating the second constant on time responsive to the detection signal.

9. The method of claim 8, wherein the step of generating the second constant on time responsive to the detection signal comprises the steps of:
   discharging a capacitor responsive to the detection signal;
   providing a current which is related to an input voltage of the COT mode power supply to charge the capacitor; and comparing a voltage of the capacitor with the output voltage to generate the second constant on time.

10. The method of claim 8, wherein the step of generating the second constant on time responsive to the detection signal comprises the steps of:
discharging a capacitor responsive to the comparison signal;
providing a current which is related to an input voltage of the COT mode power supply to charge the capacitor;
comparing a voltage of the capacitor with the output voltage to generate the second constant on time; and
adjusting at least one of the capacitor, the current, and the output voltage responsive to the detection signal to determine the second constant on time.

* * * * *